United States Patent [19]
Dee

[11] Patent Number: 6,115,217
[45] Date of Patent: Sep. 5, 2000

[54] MULTI-ELEMENT READ/WRITE TAPE HEAD WITH LOW FEEDTHROUGH

[75] Inventor: Richard H. Dee, Louisville, Colo.

[73] Assignee: Storage Technology Corporation, Louisville, Colo.

[21] Appl. No.: 09/150,810

[22] Filed: Sep. 10, 1998

[51] Int. Cl.[7] ...................................................... G11B 5/17
[52] U.S. Cl. ...................... 360/123; 360/121; 360/124; 360/63
[58] Field of Search ............................. 360/63, 121, 123, 360/124, 126

[56] References Cited

U.S. PATENT DOCUMENTS

| | | | |
|---|---|---|---|
| 4,539,615 | 9/1985 | Arai et al. | 360/121 |
| 4,945,439 | 7/1990 | Sato | 360/124 |
| 5,541,793 | 7/1996 | Schwarz | 360/121 |
| 5,883,750 | 3/1999 | Maurice et al. | 360/63 |

FOREIGN PATENT DOCUMENTS

| | | |
|---|---|---|
| 60-182001 | 9/1985 | Japan . |
| 2-71405 | 3/1990 | Japan . |

*Primary Examiner*—Jefferson Evans
*Attorney, Agent, or Firm*—Brooks & Kushman P.C.

[57] ABSTRACT

Read-while-write feedthrough is reduced in a tape deck having a multi-element read/write tape head. The tape deck includes write circuits for converting a substream of a data stream into an electrical signal. The read/write head has a sequence of write elements each having a coil for converting a received electrical signal into a magnetic field. A wire pair connects each write circuit with a corresponding write element. The system is designed such that the magnetization pattern written on the tape by one write element in response to a particular data substream has magnetization directions reversed from a second magnetization pattern written on the tape by a neighboring write element in response to the same substream. The feedthrough is thereby reduced by permitting cancellation of magnetic fields from write elements.

8 Claims, 5 Drawing Sheets

MULTI-ELEMENT READ/WRITE TAPE HEAD WITH LOW FEEDTHROUGH

TECHNICAL FIELD

The present invention relates to multi-element read/write thin film tape heads with reduced feedthrough from a write element to a read element during read-while-write operations.

BACKGROUND ART

In order to meet the demand for increasing areal densities in magnetic tape, many technological innovations are required. A first technological innovation is the ability to write multiple data tracks on a magnetic tape simultaneously. This can be accomplished through the use of a multi-element tape head containing a sequence of write elements, each write element writing one track across the width of the tape. In order to improve data reliability, a read element corresponding to each write element reads the magnetic field from the tape immediately after it is written. This technique is known as read-while-write. To increase data transfer, the tape may be written as it travels in either direction across the tape head. This requires a read element on either side of each write element, resulting in a read-write-read head configuration.

A second technological innovation increasing magnetic tape areal density is the continued shrinking of data track width and spacing between data tracks. This reduction in track geometry requires a corresponding reduction in the size and spacing of read and write elements. Thin film technologies have permitted the dimensions of tape head elements to shrink at a rate mirroring that of the integrated circuit industry.

Increasing track densities and decreasing tape head geometries create many new design challenges and magnify existing problems. One such difficulty is feedthrough. Feedthrough occurs during a read-while-write operation when a read element receives a magnetic signal directly from a write element transmitted either through the air or through the tape head itself. This direct magnetic signal appears as noise degrading the signal read from the magnetic tape.

Many techniques to reduce feedthrough have been developed. Most of these techniques require the addition of magnetically permeable shields around read elements, write elements, or both. The addition of such magnetic shields requires additional material, additional processing steps, and increased head size. What is needed is a technique for reducing feedthrough that does not add significant material, cost, or complexity to the tape head.

SUMMARY OF THE INVENTION

It is an object of the present invention to provide a tape deck having reduced feedthrough from a write element to a read element.

It is another object of the present invention to provide a read/write tape head with reduced feedthrough that requires no additional material over present read/write tape heads.

Still another object of the present invention is to provide a read/write tape head with reduced feedthrough having substantially the same complexity as present read/write tape heads.

Yet another object of the present invention is to provide methods for reducing feedthrough in read/write tape heads.

In carrying out the above objects and other objects and features of the present invention, a tape deck is provided for writing a data stream onto a magnetic tape inserted therein. The tape deck includes write circuits for converting a substream of the data stream into an electrical signal. A multi-element read/write head having a sequence of write elements and a plurality of read elements accesses the magnetic tape. Each write element has a coil wound in a coil direction for converting a received electrical signal into a magnetic field for writing on the tape. A pair of wires connects each write circuit with a corresponding write element. The electrical signal received by each write element is the converted portion of the data stream from a corresponding write circuit. The system is designed such that a first magnetization pattern written on the tape by one write element in response to a particular substream has magnetization directions reversed from a second magnetization pattern written on the tape by a neighboring write element in response to the same particular substream. This allows feedthrough to be reduced by cancellation of magnetic fields from write elements.

In an embodiment of the present invention, the coil direction in each write element is in the opposite rotational direction of the coil direction in a neighboring write element.

In another embodiment of the present invention, the pair of wires connecting each wire element to the corresponding write circuit is cross-connected relative to the pair of wires connecting a neighboring write element to the corresponding neighbor element write circuit.

In still another embodiment of the present invention, the write circuit connected to each write element generates a signal in response to a particular substream that is inverted from the signal generated by the write circuit connected to a neighboring write element in response to the same particular substream.

A method of reducing feedthrough seen by at least one read element in a multi-element read-while-write read/write tape head is also provided. The method includes dividing a data stream into a set of substreams, one substream for each write element. A write element drive signal is generated corresponding to each substream. Each drive signal is transmitted to a corresponding write element. Each write element converts the write signal to a flux signal. For a set of substreams having identical data patterns for each substream, the flux signal from a particular write element produces magnetization fields having the magnetization direction corresponding to any particular bit in the substream opposite of the magnetization direction corresponding to the same particular bit in the substream produced by the flux signal from any write element that is a neighbor of the particular write element.

The above objects and other objects, features, and advantages of the present invention are readily apparent from the following detailed description of the best modes for carrying out the invention when taken in connection with the accompanying drawings.

BEST MODES FOR CARRYING OUT THE INVENTION

Figure 1:
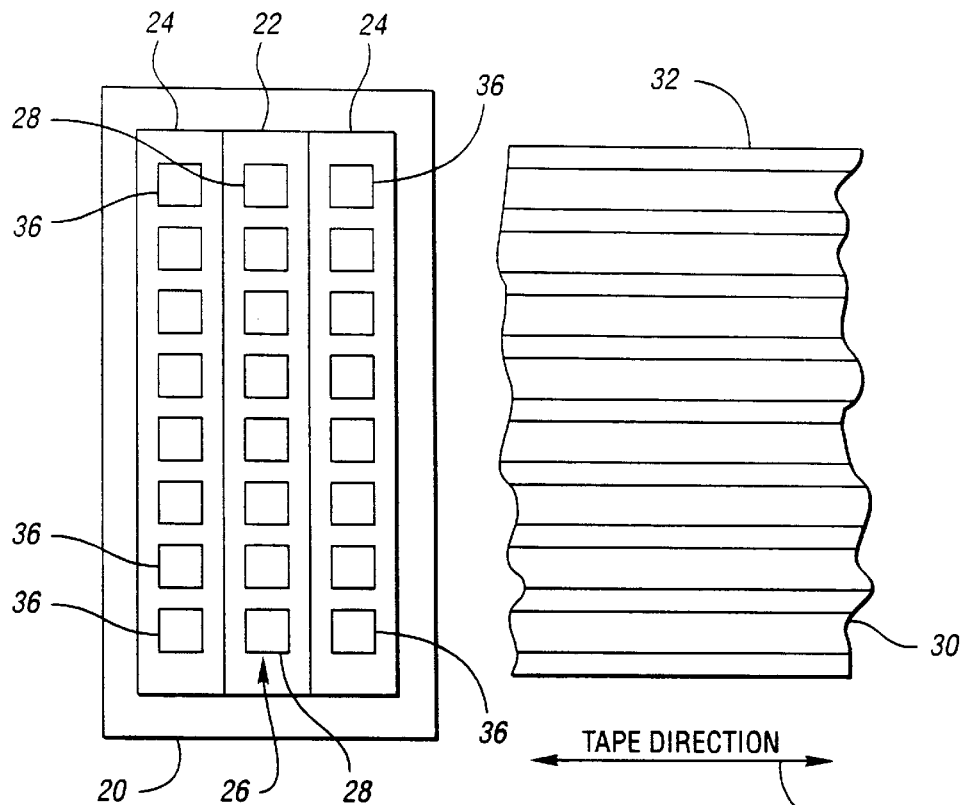
FIG. 1 is a conceptualized drawing of a magnetic tape and a multi-element read/write head.

Referring now to FIG. 1, a conceptualized drawing of a magnetic tape and a multi-element read/write tape head is shown. Tape head 20 includes write module 22 in between two read modules 24. Write module 22 includes a sequence of write elements, shown generally by 26. Each write element 28 in sequence of write elements 26 can write data track 30 onto tape 32 as tape 32 moves past write module 22 in tape direction 34.

In order to ensure the accuracy of data written onto tape 32, read element 36 in read module 24 senses the magnetic fields written onto data track 30. If the read signal does not conform to the written signal, an error has occurred and the track can be rewritten. Since read element 36 is operating concurrently with write elements 28, feedthrough may occur between any write element 28 and read element 36.

Figure 2:
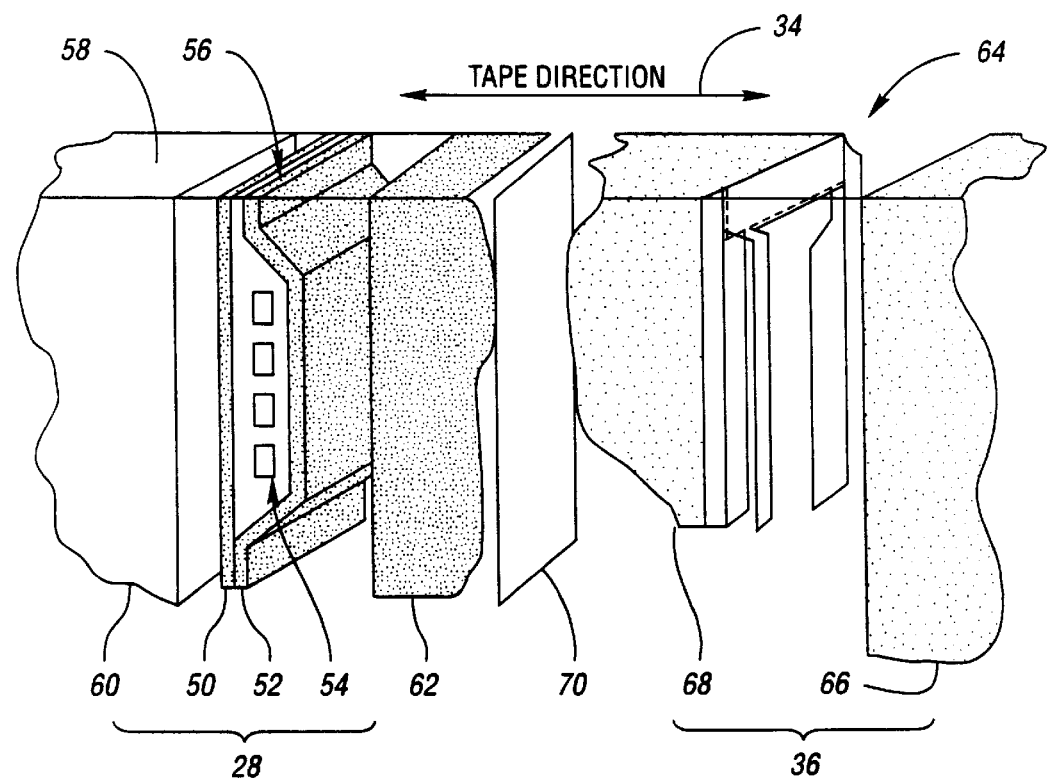
FIG. 2 is a conceptualized perspective drawing of a thin film write element and a thin film read element in a tape head.

Referring now to FIG. 2, a conceptualized perspective drawing of a thin film write element and thin film read element in a tape head is shown. The proportions shown for write element 28 and read element 36 is not accurate and the spacing between elements 28,36 is much greater than actually shown.

An electromagnet is formed by bottom pole 50, top pole 52, and coil 54 in write element 28. A current in coil 54 induces flux in poles 50,52. This flux produces a field at gap 56. As tape 32 moves across tape contact surface 58 in either direction shown as tape direction 34, the field produced by current in coil 54 produces magnetization fields on tape 32 that have a magnetization direction corresponding to the direction in which current flows through coil 54. Tape 32 is not shown for clarity.

Poles 50,52 are typically constructed of a magnetically permeable alloy or amorphous mixture including at least one of elements cobalt, nickel, and iron. Coil 54 is a conductor, such as copper, that is insulated from poles 50,52. This insulation extends into gap 56. This insulation may be built from layers of photoresist with a layer of alumina against one of poles 50,52, the alumina extending into gap 56. Write element 28 may be built on substrate 60 and capped with cover layer 62, both of which may be constructed of an insulator with good wear properties such as AlTiC.

Read element 36 typically includes magnetoresistive sensor 64 which exhibits a change in resistance due to magnetization fields on magnetic tape 32 moving over tape contact surface 58 in tape direction 34. Magnetoresistive sensor 64 is built on substrate 66 and includes cover layer 68. Substrate 66 and cover layer 68 are typically made of a magnetically permeable material, such as nickel-zinc (NiZn) ferrite, to enhance the sensitivity of magnetoresistive sensor 64.

Previous methods to reduce feedthrough between write element 28 and read element 36 include shield 70. Shield 70 is typically constructed of a conducting material such as brass.

Figure 3:
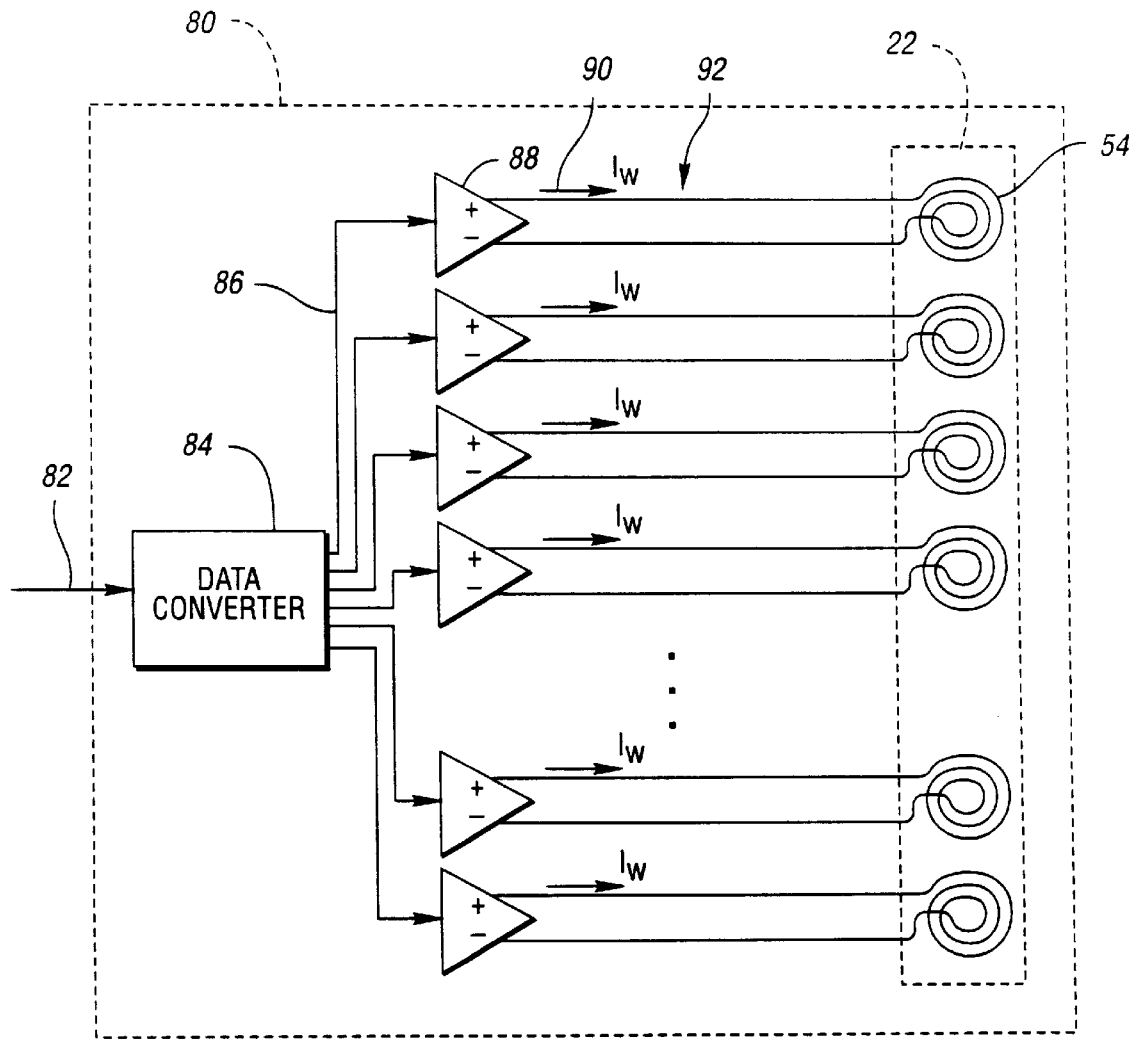
FIG. 3 is a block diagram illustrating write operation of a tape deck.

Referring now to FIG. 3, a block diagram illustrating write operation of a tape deck is shown. Tape deck 80 receives binary data stream 82 from a device, such as a computer, requesting data storage. Data converter 84 accepts data stream 82 and divides data stream 82 into a set of data substreams, one of which is shown by 86. For example, data stream 82 may be comprised of a sequence of n-bit words. Data converter 84 breaks each n-bit word into n 1-bit words. Each data substream 86 is fed into a corresponding write circuit 88.

Each write circuit 88 converts corresponding data stream 86 into a write signal represented by write current $I_W$ 90. Wire pair 92 provides a path for write current 90 between write circuit 88 and corresponding coil 54. Data converter 84 and write circuit 86 may also break data stream 82 into blocks, insert control codes, provide error detection and correction information, and add equalization signals.

The present invention reduces feedthrough by cancelling magnetic fields produced by neighboring write elements 28. More specifically, the magnetization directions in the magnetization pattern written on tape 32 by one write element 28 in response to a particular data substream 86 are reversed from the magnetization directions in the magnetization pattern written on tape 32 by a neighboring write element 28 in response to an identical data substream 86. Various embodiments for accomplishing this cancellation are described in FIGS. 4–6 below.

Figure 4:
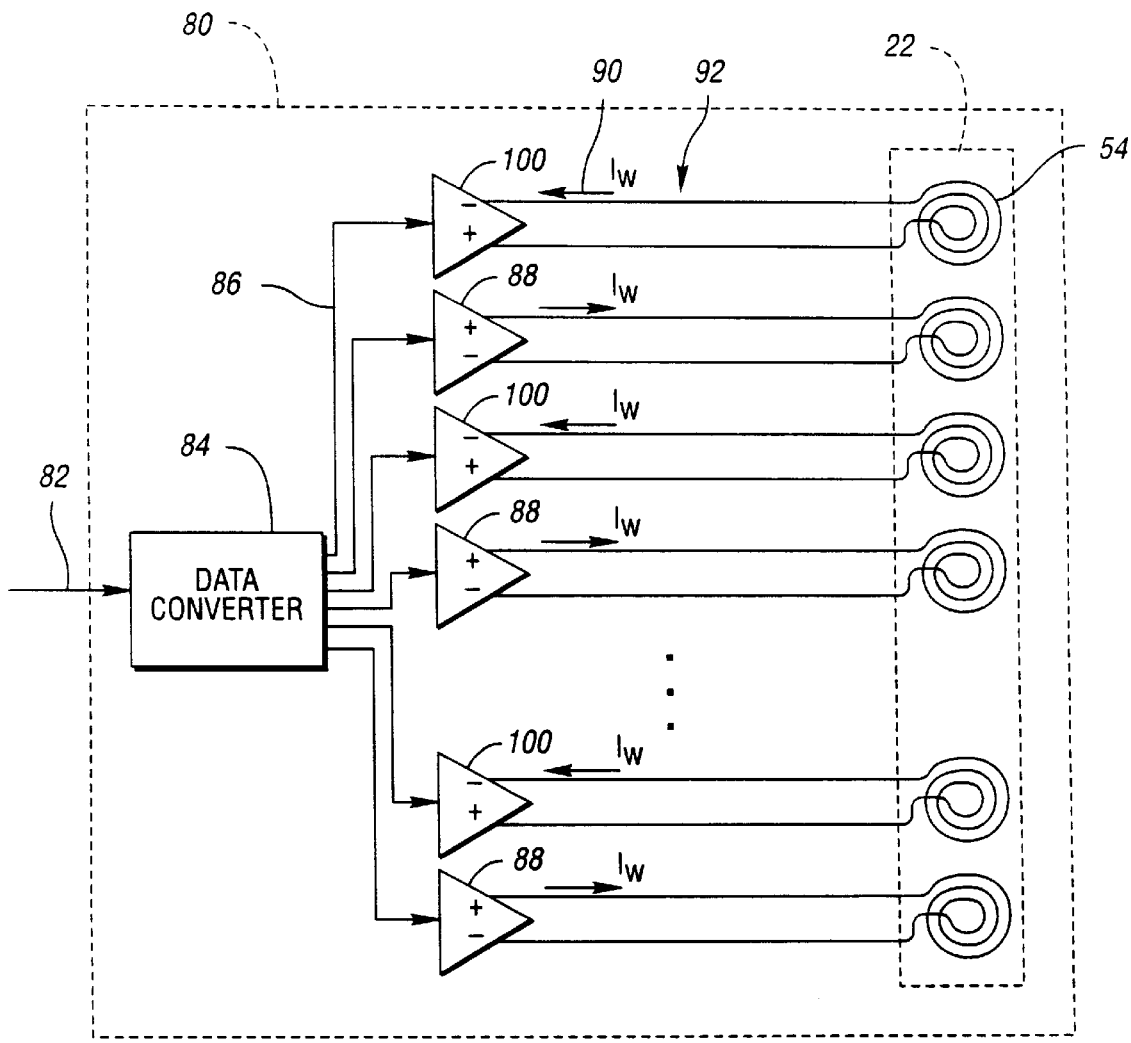
FIG. 4 is a block diagram of an embodiment of the present invention having the output polarity of each write circuit inverted relative to neighboring write circuits.

Referring now to FIG. 4, a block diagram of an embodiment of the present invention having the output polarity of each write circuit inverted relative to neighboring write circuits is shown. Tape deck 20 now includes both write circuits 88 and inverted output write circuits 100. Inverted output write circuits 100 produce write current 90 that is at any instant of time flowing in the opposite direction of write current 90 produced by write circuit 88 for the same data substream 86. Write circuit 88,100 connected to each write element 28 generates a signal in response to a particular data substream 86 that is inverted from the signal generated by write circuit 100,88 connected to a neighboring write element 28 in response to the same particular data substream 86.

Figure 5:
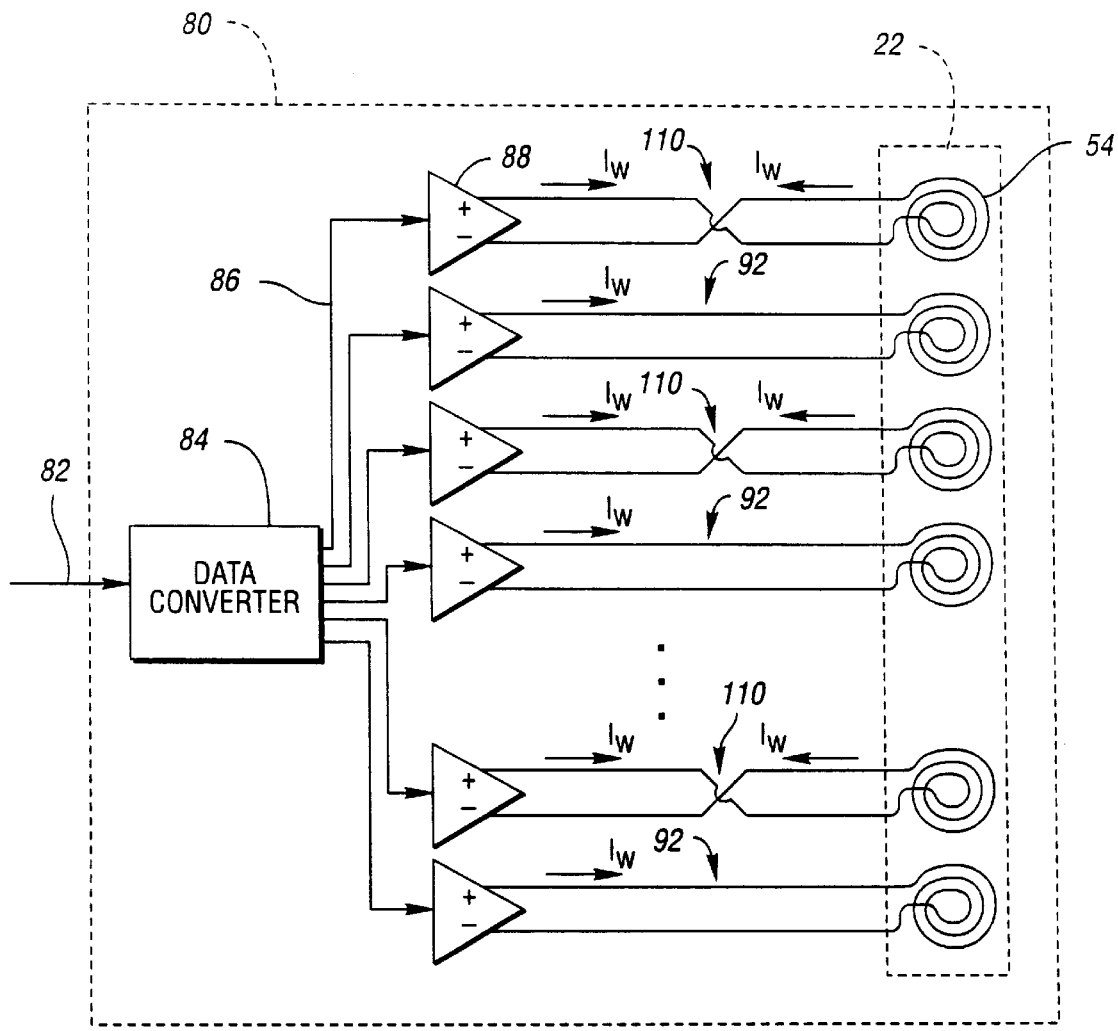
FIG. 5 is a block diagram of an embodiment of the present invention having each pair of wires connected to a write element cross-connected relative to the wires connected to neighboring write elements.

Referring now to FIG. 5, a block diagram of an embodiment of the present invention having each pair of wires connected to a write element cross-connected relative to the wires connected to neighboring write elements. Tape deck 80 contains both wire pairs 92 and cross-connected wire pairs 110. Cross-connected wire pair 110 will result in write current 90 flowing in the opposite direction through coil 54 for a given data substream 86 than the direction of write current 88 flowing through coil 54 due to wire pair 92. Wire pair 92,110 connecting each write element 28 to corresponding write circuit 88 is cross-connected relative to wire pair 110,92 connecting neighboring write element 28 to corresponding write circuit 88.

Figure 6:
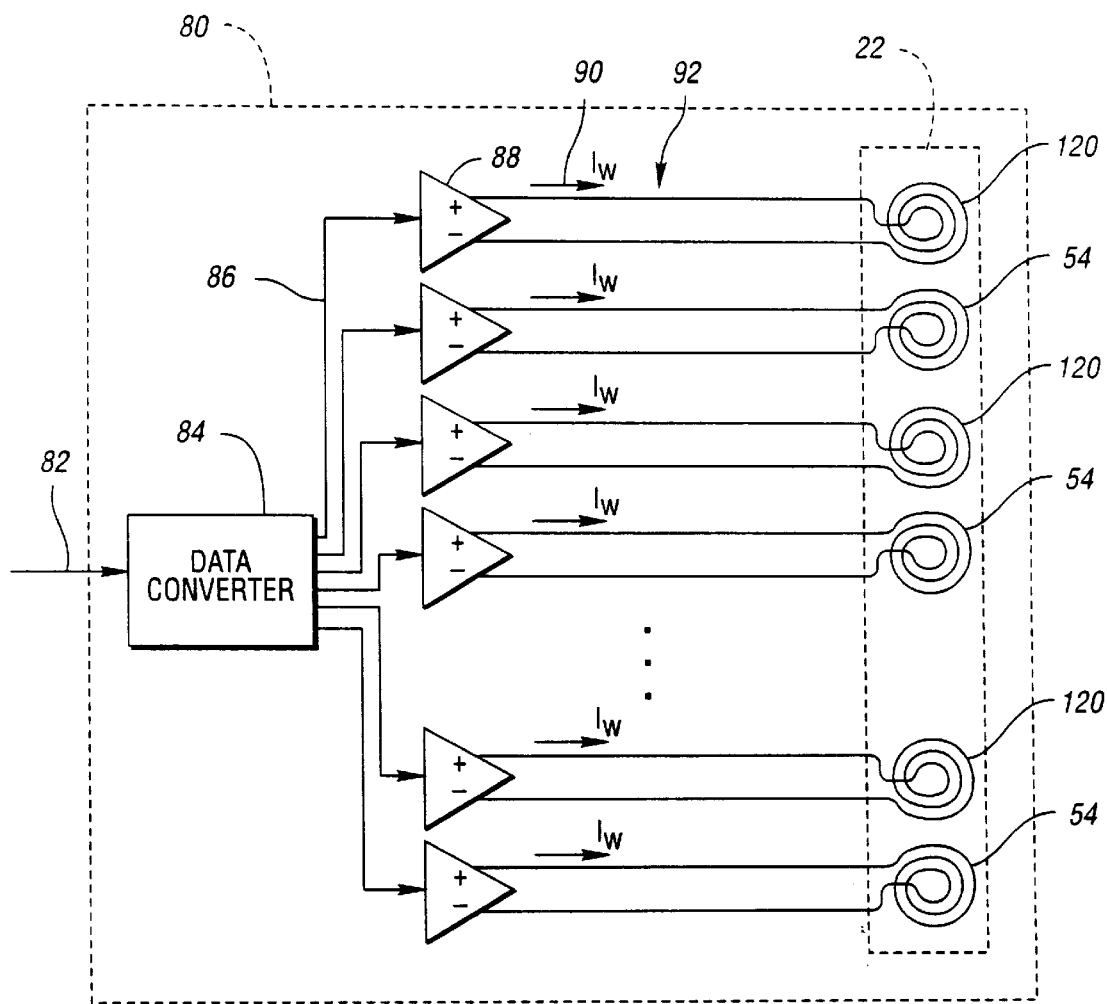
FIG. 6 is a block diagram of an embodiment of the present invention having the coil in each write element wound in the opposite rotational direction from the coil in neighboring write elements.

Referring now to FIG. 6, a block diagram of an embodiment of the present invention having the coil in each write element wound in the opposite rotational direction from the coil in neighboring write elements is shown. Tape deck 80 includes both coils 54 and oppositely wound coils 120. Oppositely wound coil 120 is wound in the opposite direction from coil 54. Write module 22 is constructed such that the coil direction for coil 54,120 in each write element 28 is in the opposite rotational direction of the coil direction for coil 120,54 of neighboring write element 28.

It has long been supposed that, for typical data stream 82, data in each data substream 86 would be uncorrelated with corresponding data in any other data substream 86. If this were the case, the present invention would not reduce feedthrough, because fields produced by neighboring write elements 28 would be additive as often as they were subtractive. However, data streams 86 are somewhat correlated. This may be due to several reasons.

The first reason why data substreams 86 appear to be somewhat correlated is due to control signals which are generally the same for all write elements 28. These control signals include synchronization bursts, identification markers, start-of-data and end-of-data fields, and the like.

A second reason why signals written onto tape 32 from different data substreams 86 may be somewhat correlated results from the manner in which data stream 82 is coded. The formation of data blocks, the addition of error detection and correction bits, and the injection of equalization signals may further correlate write currents 90 delivered to neighboring write elements 28.

A test system was built in which neighboring coils 54,120 had opposite coil directions. Actual data was used for data stream 82. Wright module 22 having neighboring coils 54,120 with opposite coil directions showed an approximately 3 dB increase in signal-to-feedthrough noise ratio over a similar write module 22 with coils 54 all wound in the same direction.

While the best modes for carrying out the invention have been described in detail, other implementations are possible within the spirit and scope of the present invention. For example, a read-write-read head was described above. Any combination of read and write modules having any configuration may be used. Those familiar with the art to which this invention relates will recognize various alternative designs and embodiments for practicing the invention as defined by the following claims.

What is claimed is:

1. A tape deck for writing a data stream onto a magnetic tape inserted therein comprising:

a plurality of write circuits, each write circuit operable to convert a substream of the data stream into an electrical signal;

a multi-element read/write head for accessing the magnetic tape, the head having a sequence of write elements and a plurality of read elements, wherein each write element has a coil wound in a coil direction for converting a received electrical signal into a magnetic field for writing on the tape; and a wire pair connecting each write element with a corresponding write circuit wherein the write element received electrical signal is the converted substream of the data stream from the corresponding write circuit;

wherein a first magnetization pattern written on the tape by one write element in response to a particular substream has magnetization directions reversed from a second magnetization pattern simultaneously written on the tape by a neighboring write element in the sequence of write elements in response to the same particular substream;

thereby reducing the feedthrough at a corresponding read element by allowing cancellation of magnetic fields from write elements.

2. A tape deck as in claim 1 wherein the coil direction in each write element is in the opposite rotational direction of the coil direction in a neighboring write element, thereby allowing cancellation of magnetic fields from neighboring write elements.

3. A tape deck as in claim 1 wherein the wire pair connecting each write element to the corresponding write circuit is cross-connected relative to the wire pair connecting a neighboring write element to the corresponding neighbor element write circuit, thereby allowing cancellation of magnetic fields from neighboring write elements.

4. A tape deck as in claim 1 wherein the write circuit connected to each write element generates a signal in response to a particular data substream that is inverted from the signal generated by the write circuit connected to a neighboring write element in response to the same particular data substream, thereby allowing cancellation of magnetic fields from neighboring write elements.

5. A method of reducing feedthrough seen by at least one read element in a multi-element read-while-write read/write tape head, the tape head part of a tape deck operative to write a data stream onto a magnetic tape inserted therein, the tape head comprising a sequence of write elements, a plurality of write elements in close proximity with the at least one read element, the method comprising:

dividing the data stream into a set of substreams, one substream for each write element;

generating a write element drive signal corresponding to each substream;

transmitting each drive signal to a corresponding write element; and converting the write signal to a flux signal in each write element, each flux signal producing corresponding magnetization fields on the magnetic tape;

wherein, each said write element simultaneously writes on said magnetic tape and for a set of substreams having identical data patterns for each substream in the set of substreams, the flux signal from a particular write element produces magnetization fields having the magnetization direction corresponding to any particular bit in the substream opposite of the magnetization direction corresponding to the same particular bit in the substream produced by the flux signal from any write element that is a neighbor of the particular write element, thereby reducing the feedthrough seen by the at least one read element.

6. A method of reducing feedthrough as in claim 5, having the flux signal from the particular write element produce magnetization fields with the magnetization direction corresponding to any particular bit in the substream opposite of the magnetization direction corresponding to the same particular bit in the substream produced by the flux signal from any write element that is a neighbor of the particular write element is accomplished by inverting the write element drive signal generated for the particular write element relative to the drive signal generated for any write element that is a neighbor of the particular write element.

7. A method of reducing feedthrough as in claim 5 wherein transmitting each drive signal to a corresponding write element is accomplished by a wire pair connecting means for generating a write element drive signal to the corresponding write element, having the flux signal from the particular write element produce magnetization fields with the magnetization direction corresponding to any particular bit in the substream opposite of the magnetization direction corresponding to the same particular bit in the substream produced by the flux signal from any write element that is a neighbor of the particular write element is accomplished by cross-connecting the wire pair connected to the particular write element relative to the connection of wires for any write element that is a neighbor of the particular write element.

8. A method of reducing feedthrough as in claim 5 wherein converting the write signal to a flux signal in each write element is accomplished by a coil wound in a coil direction about a magnetic core, having the flux signal from the particular write element produce magnetization fields with the magnetization direction corresponding to any particular bit in the substream opposite of the magnetization direction corresponding to the same particular bit in the substream produced by the flux signal from any write element that is a neighbor of the particular write element is accomplished by winding the coil for the particular write element in the opposite direction as the coil direction for any write element that is a neighbor of the particular write element.

* * * * *